(No Model.)

R. J. WOODWORTH.
FEED TROUGH.

No. 421,465. Patented Feb. 18, 1890.

Witnesses
Geo. E. Fitch.

Inventor
Ralph J. Woodworth
By his Attorneys,
R. W. Bishop.
C. A. Snow & Co.

UNITED STATES PATENT OFFICE.

RALPH J. WOODWORTH, OF WAHOO, NEBRASKA.

FEED-TROUGH.

SPECIFICATION forming part of Letters Patent No. 421,465, dated February 18, 1890.

Application filed July 25, 1889. Serial No. 318,610. (No model.)

*To all whom it may concern:*

Be it known that I, RALPH J. WOODWORTH, a citizen of the United States, residing at Wahoo, in the county of Saunders and State of Nebraska, have invented a new and useful Feed-Rack, of which the following is a specification.

My invention relates to improvements in feed-racks; and it consists in certain novel features hereinafter described and claimed.

Figure 1:
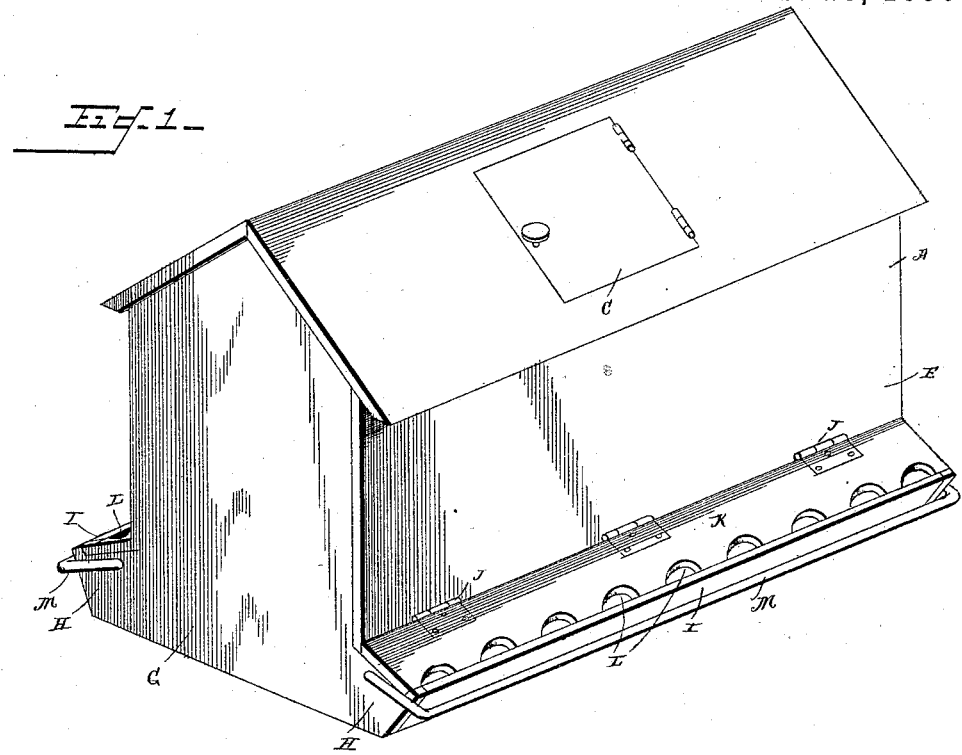
Figure 2:
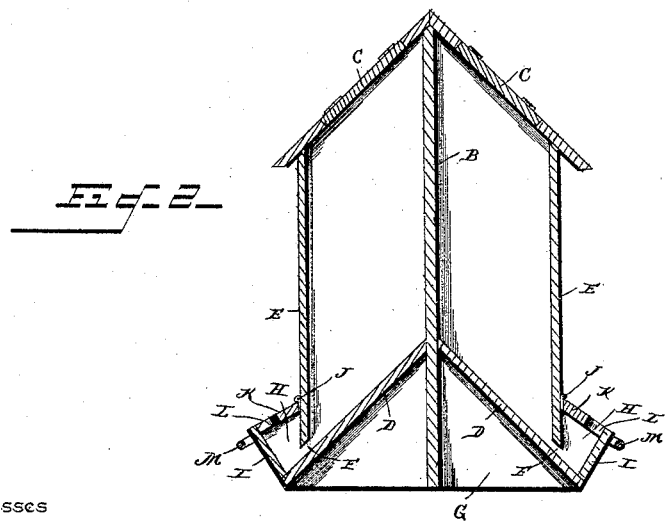

In the accompanying drawings, Figure 1 is a perspective view of my improved feed-rack. Fig. 2 is a vertical cross-section of the same.

In carrying out my invention I employ a bin or hopper A, which is provided with an internal longitudinal partition B, so as to divide it into two compartments, and thereby adapt it to contain two different kinds of feed at the same time, and has the doors C in its roof, through which the feed is placed in the proper compartment. The bottoms D of the compartments are inclined so as to direct the feed toward the sides of the device, and the side walls E terminate a slight distance above the bottoms, thereby providing the open spaces F, which extend the entire length of the device and permit the feed to escape in small quantities. The end walls G of the hopper are provided with extended portions H, which project beyond the bottoms D and the side walls E, and between the said extended portions I secure the rail or board I, thereby forming a trough, into which the feed escapes through the opening F. To the side walls E, I secure, by the hinges J, the covers K, which are provided in their outer edges with the notches L. These covers extend over the troughs and prevent the animals scattering the feed, while access can be had to the feed through the notches L, as will be readily understood. At the same time, whenever it is desired to clean the trough, as by a broom, mop, or stream of water, the covers K may be lifted up to a vertical position and there held by any suitable means, and ready access can be had to the trough from above for this purpose.

In order to prevent the animals scattering mud and dirt over the device and mixing the same with the feed, I provide the fenders M, which consist of U-shaped rods or bars having their ends secured in the end walls of the hopper, and extending the entire length of the hopper, and project from the trough. These fenders prevent the animals crowding so near the troughs as to scatter the feed over the ground.

From the foregoing description, taken in connection with the accompanying drawings, it will be seen that I have provided a simple and efficient feed-rack, by the use of which the animals will be provided with a constant supply of feed, and at the same time they will be prevented from scattering the feed and thereby wasting the same.

Having thus described my invention, what I claim, and desire to secure by Letters Patent, is—

The combination, with the feed-rack having a trough on its side, of the fender pivotally secured to the ends of the trough and projecting beyond the same parallel with the side thereof, as set forth.

In testimony that I claim the foregoing as my own I have hereto affixed my signature in presence of two witnesses.

RALPH J. WOODWORTH.

Witnesses:
N. H. BELL,
JOHN M. KNOX.